US012475810B2

(12) United States Patent
Janis et al.

(10) Patent No.: US 12,475,810 B2
(45) Date of Patent: Nov. 18, 2025

(54) SKIN SIMULATING DEVICE FOR TESTING ADHESIVES

(71) Applicant: Hollister Incorporated, Libertyville, IL (US)

(72) Inventors: Abram D. Janis, Grayslake, IL (US); Adrian P. DeFante, Chicago, IL (US); Ananya Chakravarti, East Amherst, NY (US); Isadora Kucera, Chicago, IL (US); Mallory Lager, Chicago, IL (US); Beatriz Soares, New York City, NY (US)

(73) Assignee: HOLLISTER INCORPORATED, Libertyville, IL (US)

( * ) Notice: Subject to any disclaimer, the term of this patent is extended or adjusted under 35 U.S.C. 154(b) by 930 days.

(21) Appl. No.: 17/686,859

(22) Filed: Mar. 4, 2022

(65) Prior Publication Data

US 2022/0284829 A1      Sep. 8, 2022

Related U.S. Application Data

(60) Provisional application No. 63/157,237, filed on Mar. 5, 2021.

(51) Int. Cl.
*G09B 23/24* (2006.01)
*G09B 23/30* (2006.01)

(52) U.S. Cl.
CPC .............. *G09B 23/24* (2013.01); *G09B 23/30* (2013.01)

(58) Field of Classification Search
CPC ....... G09B 23/24; G09B 23/30; G09B 23/303
See application file for complete search history.

(56) References Cited

U.S. PATENT DOCUMENTS

| | | | | |
|---|---|---|---|---|
| 2008/0261009 A1* | 10/2008 | Kawabata | ............... | A61B 8/587 264/331.19 |
| 2009/0098521 A1* | 4/2009 | Kuo | ........................ | G09B 23/30 434/267 |
| 2016/0082433 A1* | 3/2016 | Baltenneck | ........ | G01N 33/4875 422/503 |
| 2019/0118176 A1* | 4/2019 | Dupire | ............. | B01L 3/502715 |
| 2020/0392440 A1* | 12/2020 | Nieh | ................... | G01N 33/5008 |
| 2020/0405169 A1* | 12/2020 | Wieringa | .............. | A61B 5/1495 |

FOREIGN PATENT DOCUMENTS

WO    WO-2020152282 A1 *   7/2020   ......... A61L 27/3813

* cited by examiner

*Primary Examiner* — Stephanie E Bloss
*Assistant Examiner* — Diana Hancock
(74) *Attorney, Agent, or Firm* — Klintworth & Rozenblat LLP

(57) ABSTRACT

A skin-mimicking device includes a body and a plurality of conduits defining a plurality of fluid paths to an outer surface of the body. The skin-mimicking device is configured to simulate various skin perspiration conditions by controlling a flow rate of a sweat mimicking fluid through the plurality of conduits as well as simulate the mechanical properties of skin by tuning a composition of the body.

14 Claims, 7 Drawing Sheets

SKIN SIMULATING DEVICE FOR TESTING ADHESIVES

BACKGROUND

The following description relates to devices for simulating skin and methods for testing adhesives using the same.

Ostomy is a surgical procedure to effectively substitute excretory function by deviating the bladder, small intestine, large intestine and other tubular organs through a stoma, which provides an opening in the torso, abdomen, or other anatomical site. In the case of colostomy, it enables digestive waste product that naturally passes through the large intestine through the rectum and anus to be bypassed to the opening in the abdomen, for example, in the right lower quadrant of the abdomen. Such a procedure may provide improved quality of life and may be either permanent or temporary. It is often necessary in order to enable intestine healing after surgery to treat bowel cancer, replace bladder function in bladder cancer or paralysis, or to relieve small and large intestinal inflammation for Crohn's disease of ulcerative colitis patients, as well as to allow surgery and healing in the lower end of the digestive system (anus or rectum). After an ostomy surgery, the patient may need an ostomy pouch to collect digestive waste products that would usually pass through the lower end of the digestive system or through the bladder and urethra.

Maintaining the integrity and health of the peristomal skin are critical for ostomates to maintain their quality of life. Inflammatory and infectious conditions can affect skin greatly and are a source of aggravation to ostomates causing peristomal skin complications that require extensive care, which may be costly when compared to preventive care. According to a study, about 58% of ostomates have reported redness, about 46% have reported burning, and about 39% have reported pain or soreness around their stoma. The health of the peristomal skin is important as it provides a surface to which an ostomy skin barrier adheres to. A healthy, dry, intact skin, and a well-fitted ostomy skin barrier may reduce a risk of leakage and provide a secure attachment of an ostomy pouch to a user. Common causes for peristomal skin complications may be poorly fitted ostomy barriers, mechanical stripping, enzymatic exposure, or chronic urine exposure. A serial change in ostomy barriers can cause skin stripping that leaves a painful, itchy, and burning skin. In the case of ileostomy, such process is often coupled with the leakage of intestinal waste that is rich in enzymes and causes harmful proteolytic activity in the skin, leaving it scalded, worn, and severely damaged.

Often, peristomal skin complications are aggravated by a lack of medical care professionals specialized in the post-operatory of ostomies, as well as by patient's inability to recognize that the injured skin is abnormal and should receive attention, given that 80% of them do not seek medical care to treat it.

Ostomy Systems

In ostomy care, there are a variety of pouching systems available in one and two-piece options. One-piece category integrates the wafer, which is the solid adhesive skin barrier that sticks to the skin around the stoma to hold the pouch in place, protect the skin, and prevent leakage, to the collection pouch itself. The one-piece can be drained for prolonged usage or disposable; the latter is more prone to cause skin irritation around the stoma as it is more often removed and put back on the peristomal site. The two-piece systems, on the other hand, is more gentle on the skin as the wafer remains in place for several days and it is attached to the ostomy pouch, meaning it can be put in and taken out for substitution or drainage without removing and placing the wafer adhesive on the skin as often. Another advantage for the two-piece system is that it is faster to change the ostomy pouch, but it might be uncomfortable as it can be bulkier than one-piece appliances.

Ostomy skin barriers are available in flat and convex shapes. The choice of shape will depend on the type of stoma. Convex barriers are advisable for "patients with flush or retracted stomas and those with soft abdominal tissue around the stoma" and available in degrees of convexity and firmness of the skin barrier. Appropriate care must be taken otherwise the ostomy barriers will not be effective, possibly causing pressure necrosis.

The wafer that sticks to the skin around the stoma to prevent leakage can be pre-cut, when the barrier comes in common stoma sizes. It can be cut-to-fit as well, when it is necessary to trim a hole into the wafer in the shape of the patient's stoma, which is useful for stomas that do have common shapes. There are also moldable skin barriers, made out of material that is shaped to fit the patient's stoma, being the best at preventing leakages. The ostomy pouches can either be drainable or disposable. The pouches can be drainable or closed-end, meaning that the former is reusable for a few times and it is attached to the wafer through a clip, while the latter has to be disposed of after a single use.

Adhesive Devices

Ostomy adhesives contain PSAs (pressure sensitive adhesives). These adhesives are non-reactive and form a bond with the surface when a slight pressure is applied. The criteria for an ostomy adhesive may be the ability to stick to the surface as well as absorb moisture, either from the sweat and evaporative water loss from the skin, or due to leakage at the stoma/barrier interface. In one-piece ostomy pouches, the skin barrier is permanently attached to the pouch, and the adhesive is therefore permanently attached to the bag. These bags are typically worn only for a short period of time (3 hours to 1 day) and are optimized for ease of removal. In two-piece ostomy bags, the skin barrier is separate from the pouch, and they are connected by a flange (plastic ring). The adhesive is attached to the bag via a coupling system and is designed for increased adhesion and resistance to erosion in order to be worn for a longer period of time (1 to 6 days).

Originally, adhesives were produced using zinc oxide—this material had the primary purpose of supporting the ostomy bag. The production of adhesives then changed to using karaya gum and glycerol. In addition to supporting the ostomy bag, these materials also absorb moisture from the skin, which includes liquids resulting from humidity, perspiration, and stoma effluent (such as bowel contents and alkaline urine). If left on the surrounding peristomal skin for an increased period of time, these factors can cause irritant contact dermatitis and other skin issues. However, the problem with these adhesives is that they tend to dissolve around the stoma, leaving the peristomal skin unprotected. In addition, Karaya gum has a lower adhesion to the skin than zinc oxide, compromising on the efficacy of the ostomy pouch support. Current and more recent adhesives use technology to make a combination of adhesives, which utilize both naturally-occurring and synthetic raw materials.

The adhesives may comprise hydrocolloids, which are hydrophilic and absorb moisture from the skin while controlling erosion; hydrophobic polymers, which are responsible for adhesion and removal; synthetic resin to provide immediate adhesion and stickiness; and plasticizers which control adhesion and increase flexibility. There are several variants of these materials that are used and different classes of materials within these categories.

In order to assist with the ostomy bag or decrease discomfort of removal, an individual can use an assistive device as well. These may include:

Convex inserts—discs inserted inside a two-piece ostomy bag flange

Ostomy belts—circle the abdomen and attach to the pouch

Pouch covers—decrease discomfort of skin through a cotton backing that fits over the pouch Skin barrier pastes, rings, strips—smooth and level out any irregularities in the peristomal skin and stoma Liquid/wipes/powder—help skin heal, seal irritated skin before applying the pouch Tapes—support the flange and help with waterproofing Adhesive remover—remove any tapes or wafers as well as adhesive residues Peristomal Skin The peristomal skin is the skin that surrounds the stoma and in which the ostomy barrier wafer attaches to. This adhesion to the surrounding skin may cause a few issues within the area as well as changes to the skin itself. Mechanically, the adhesive needs to be continually attached and detached due to the changing nature of the skin either daily or every 3-4 days depending on the type of adhesive and patient specific skin conditions. This causes a phenomenon known as skin stripping. If the adhesion is unable to provide an adequate barrier between the skin and the contents of the ostomy pouch, a condition known as peristomal skin complication may occur.

Skin stripping occurs when the adhesive portions of the pouch are removed, thus pulling the epidermis away from the dermis. This irritates the skin causing abrasions on the area of the skin attached to the adhesive. Other causes of mechanical skin trauma include a poorly fitted adhesive, abrasive cleaning, and frequently changing adhesives. These issues are often mediated by skin barrier wipes or sprays to assist in removing the pouch and ostomy protective powders for treatment during each pouch change. For issues such as ulceration, wound care may be needed in the form of calcium alginate, hydro-fiber, hydro-colloid, or foams. Folliculitis may also occur, in which there is inflammation and infection of the hair follicles in the peristomal skin. For this reason, extremely strong adhesives to the skin are not recommended for ostomy patients.

Chemical issues may also arise if the adhesive is unable to effectively block the contents of the pouch from reaching the surrounding skin. When the ostomy effluent comes in contact with the skin, the skin will become inflamed and might even blister or become denuded. This effect can be minimized by applying the correct skin barrier and fitting. The size of the stoma is subject to change due to swelling or post-surgical remodeling, so the patient should take note of these changes and adjust accordingly. Skin will also be at an increased risk for contact with the fluid the longer the pouch is kept on without changing. Repeated exposure to the fluid may change the skin in the surrounding area, causing it to become more coarse and bumpy. This makes it harder for the pouch to be adherent to the skin. This condition is often treated with protective pectin-based powder or applying warm water to the affected region.

Other issues that may arise include, but are not limited to, allergens, fungal infections, and suture granulomas. Allergies are patient specific and can be avoided with patch tests. A few adhesive options must therefore be offered to avoid complications. Fungal infections may cause pustules or areas of shiny red skin that are often patchy. Fungal growth can occur when a warm and moist environment such as under the adhesive is cleaned with antibacterial soaps that remove normal skin flora. Avoiding cleaning with soap can thus prevent this issue from arising. Lastly, suture granulomas may arise when there is a buildup of granulation tissue at the suture site. This must be treated by a surgeon.

Medical Adhesive Market

Medical-grade adhesives that can reduce skin-stripping as well as provide wet-adhesion are valuable to many applications beyond ostomy uses. Research has been performed in both academic and commercial settings in order to find appropriate formulations for distinct uses. Furthermore, the medical adhesive market is forecasted to grow.

There are many natural segmentations of the medical adhesive market that go beyond medical device applications. In the ostomy field, the application of adhesive technology for skin may include, for example, liquid based adhesives, pressure sensitive adhesives, and tape constructions.

Medical adhesive technology may include water-based, solvent-based or solids/hot-melt based. Water-soluble adhesives use water as carriers for resin and can come with both natural and synthetic polymers. Water-based adhesives most used in medical applications include resin/polymer-based acetate adhesives and latex adhesives—the latter of which although popularized, can cause skin irritation after prolonged use. They are also the formulations most used for medical applications due to better interactions with the body and skin. Water-based adhesives are usually non-toxic and environmentally friendly and have been developed as alternatives to solvent-based formulations. For example, a number of bioinspired adhesives (gecko, mussel, spider) are developed using solventless or water-based formulations.

Solvent-based adhesives work similarly to water-based adhesives, but solvents are used as carriers for resin instead of water. Solid-based adhesives may have applications in medical 3D printing and other technologies due to high bonding speed and production rate.

Accordingly, it is desirable to provide device for simulating skin, for example, peristomal skin, for testing and evaluating adhesives, for example, ostomy adhesives. Current, substrates formed from polymeric materials, such as Teflon™, stainless steel, or other metallic materials, which lack the mechanical and moisture properties of skin, are used for testing and evaluating adhesives. Therefore, there is a need for device that can emulate various skin properties and conditions for testing and evaluating adhesives.

SUMMARY

A tunable skin-mimicking device for testing and evaluating adhesives is provided according to various embodiments.

In one aspect, a skin-mimicking device may comprise a body and a plurality of conduits defining a plurality of fluid paths to an outer surface of the body. The skin-mimicking device may be configured to simulate various skin perspiration or evaporative water loss conditions, wherein a fluid flow rate through the plurality of conduits may be controlled to provide the various skin perspiration conditions. The body may be formed from polydimethylsiloxane.

In an embodiment, the skin-mimicking device may further comprise at least one fluid reservoir connected to the plurality of conduits for supplying sweat mimicking liquid. The plurality of conduits may extend from the at least one fluid reservoir to the outer surface of the body to provide the plurality of fluid flow paths therethrough. The skin-mimicking device may include at least one liquid pump connected to the at least one fluid reservoir for supplying the sweat-mimicking liquid, wherein the liquid pump may be configured to control the fluid flow rate. In some embodiments, the fluid reservoir may be provided in the body.

In an embodiment, the skin-mimicking device may further include a simulated stoma with at least one fluid reservoir connected to the plurality of conduits for supplying a dejecta mimicking liquid. The plurality of conduits may extend from the at least one fluid reservoir to the outer surface of the body to provide the plurality of fluid flow paths therethrough. In such an embodiment, the skin-mimicking device may include at least one inlet tube connected to and in fluid communication with the at least one fluid reservoir for supplying the dejecta-mimicking liquid.

In an embodiment, the skin-mimicking device may comprise a backing layer, wherein the sweat mimicking liquid is supplied to the backing layer. In such an embodiment, the skin-mimicking device may be configured such that the sweat mimicking liquid may flow through the plurality of conduits as the backing layer becomes saturated with the liquid. The backing layer may be formed from a sponge, foam, or other similar porous medium.

In an embodiment, the fluid housed in the reservoir may be heated to generate evaporative water loss through the plurality of conduits through an overlying layer. Alternatively, the skin-mimicking device may be housed within an incubator to simulate basal and/or skin temperature as well as evaporative water loss.

In another embodiment, the use of clear polymers may allow the visualization and analysis of mode of failure at the adhesive/substrate interface.

In yet another embodiment, the skin-mimicking device may comprise a backing container filled with sweat mimicking liquid. In such an embodiment, the skin-mimicking device may be configured to provide a fluid flow direction against gravity from the backing container to the plurality of conduits. Alternatively, the skin-mimicking device may be configured to provide a gravity flow of the sweat mimicking liquid from the backing container to the plurality of conduits.

In some embodiments, the plurality of conduits may define a plurality of circular openings on the outer surface of the body, wherein each of the circular openings has a diameter of about 0.2 mm.

In an embodiment, the skin-mimicking device may be configured to provide a fluid flow rate through the plurality of conduits of about 0.01 µL/min to about 100 µL/min. For example, the skin-mimicking device may be configured to provide a fluid flow rate through the plurality of conduits of about 0.015 µL/min, about 0.3 µL/min, or about 50 µL/min.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
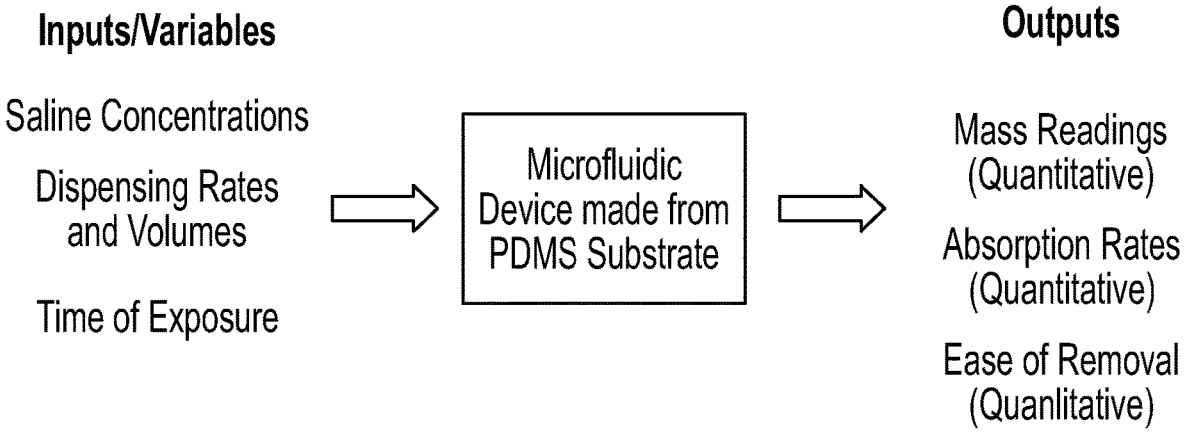
FIG. 1 is a schematic illustration of a method of testing adhesives using a microfluidic device according to an embodiment.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Appropriate adhesives are crucial to pain-free and healthy ostomy care. Up to 75% of people with ostomy experience peristomal skin irritation, also known as peristomal skin complication or PSC. There are several reasons why the skin develops such a response to the adhesives and accessories associated with the ostomy. One of the most well-studied and observed being skin stripping, which is aggravated with every replacement of ostomy skin barriers. Thus, adhesives that can reduce skin stripping while still retaining adhesion properties in the peristomal environment are of great interest. A device that mimics various peristomal conditions can facilitate testing and development of ostomy adhesives.

A device configured to simulate normal and peristomal skin, and a method of testing ostomy adhesives and other medical adhesives using the device are provided according to various embodiments. The device may be configured to mimic normal and peristomal skin properties, such as sweating, surface properties, mechanical properties, acoustic properties, optical properties, electrical properties, and thermal properties. For example, the device may be configured to simulate skin perspiration for more accurate measurement of wet adhesion. Such device may also be used to measure adhesive moisture absorption rates.

In an embodiment, the device may be configured as a microfluidic device comprising a tunable substrate for testing absorption of various adhesive products. The device may also be used to evaluate various challenges in removing an adhesive from skin as the adhesive becomes saturated with liquid. A testing method using the device may be configured to provide an improved testing method specific to ostomy barrier applications. By furthering the knowledge in the field, understanding and learning about better adhesives and testing methods can increase quality of life of ileostomy, colostomy, and urostomy patients, as well as reduce cost of care by preventing and not worsening the PSCs.

There are a number of suitable options for ostomy adhesives.

Acrylic Pressure-Sensitive Adhesives

Pressure-sensitive adhesives (PSAs) are polymeric materials composed of networks of 'hard' and 'soft' monomers that bond to surfaces due to van der Waals interactions after mild pressure. These adhesives are strong, but removable from the skin and have widespread medical applications. They also do not rely on chemical reactions, irradiation, or heat which make them ideal to wear directly on the skin to attach devices such as an ostomy pouch.

Properties of acrylic pressure-sensitive adhesives, such as tack, peel adhesion, and shear strength, may be affected by crosslinking agents added to the synthesized PSAs. Tack is the ability of the adhesive to adhere, shear is the ability to hold its position under stress, while peel is the ability to resist removal. Peel is thus inversely related to tack and sheer. In the case of adhesive devices for ostomy pouches, the adhesive may be configured to have a sufficiently strong tack and shear to hold the filled pouch, yet sufficiently peeable so as to not damage the skin underneath the adhesive.

Maintaining prolonged wear of PSAs may be challenging due to the presence of sweat and other liquids on skin surface. During perspiration, peel strength often decreases, putting the peristomal skin at risk. Thus, the PSA are often configured to absorb a certain amount of bodily fluids without losing its adhesive properties. Often, hydrocolloids are added to the polymer matrix of PSAs allowing for the fine tuning of a PSA to suit a certain situation. The acrylic family is widely available including a variety of options to choose from.

Acrylic PSAs, however, can cause irritation on skin after repeated application and can lead to varying degrees of dermatitis. The major agents of dermatitis include low molecular weight acrylic monomers, such as reactive dilutants added to improve the workability of the adhesive. These issues may be resolved to an extent by fine tuning the acrylic monomer and providing treatments for the issues caused, which can be quite challenging.

Gecko Adhesion and Mussel Adhesion

In the past two decades, researchers have tried to reproduce the materials and techniques used by animals, such as geckos and mussels, in order to adhere to surfaces. Gecko adhesion has proven to be a valuable area of study due to their use of setae, or stiff hair-like structures on their toes that allow them to easily attach to and detach from vertical surfaces while moving. The adhesive forces are strong enough that they can cling to surfaces yet remain temporary in order to allow for rapid detachment. However, the performance of synthetic gecko-mimicking adhesives over a long period of time, especially upon contact with water, tends to decrease to a less desirable level. The proteins secreted by marine mussels, has shown to be strong enough to allow them to cling to inorganic and organic surfaces even when fully immersed in water.

Gecko setae are approximately 110 μm in length, 4.2 μm in diameter, and uniformly distributed in arrays, with each seta branching to form hundreds of spatula structures that connect to the surface. The gecko setae are primarily made up of beta-keratin, with some components of alpha-keratin. It has been shown that gecko keratin proteins are not required for the adhesive effect, rather the geometry and mechanics of attachment and detachment play a far bigger role and are much more useful when creating synthetic gecko setae-mimicking adhesives. The geometry relies on the shear force to maintain adhesion via use of static and kinetic friction.

Studying the protein secreted by marine mussels shows that the presence of the amino acid 3,4-dihydroxy-L-phenylalanine (dopa), formed by post-translational modification of tyrosine, allows for oxidation-dependent adhesion. The oxidation of DOPA through metal ions or enzymes results in the formation of quinone groups, which along with phenolic hydroxyl groups, allow for covalent and non-covalent bonds and resulting adhesion to organic and inorganic surfaces.

In an embodiment, an ostomy adhesive may be configured to provide a combination of gecko and mussel adhesion properties. In such an embodiment, an ostomy adhesive may comprise arrays of polymer pillars configured to mimic the structure of the gecko setae, wherein the pillars may be coated with a polymer configured to mimic the amino acid DOPA found in mussels to provide effective and reversible attachment and detachment under varying moisture conditions.

Polydimethylsiloxanes

Polydimethylsiloxane (PDMS) is a common elastomer that is widely utilized for microfluidic devices, implants, electronic sealants, and more. In an embodiment, a skin-adhesive patch (SAP) may comprise PDMS, an adhesion of which may be controlled by altering polymer chain mobility. In such an embodiment, the polymer chain may be tuned to quantitatively make a PDMS-based SAP as skin-friendly as it can be.

An adhesion between an adhesive and the skin may depend on the proportion of polymer chains, including free chains, dangling chains, and cross-linking chains, where free chains are within the polymer, dangling chains are bound to the polymer chain through one of their ends, and cross-linked chains are bound to the polymer by both ends. A low cross-linked PDMS adhesive liquid with free and dangling chains may adhere more tightly to a substrate.

In a study that explored the potential of tuned PDMS as SAP, PDMS was mixed with cross-linking agents in different proportions, degassed, cured, cooled and were ready to be utilized. A series of mechanical force experiments were in order to measure the peeling force when put against human skin utilizing a tensile tester, normal adhesion test with sapphire sphere indenter, as well as an electric test. It also included NMR experiments to distinguish the cross-linking densities at each sample. Biocompatibility was also tested with human volunteers in order to compare the effect of redness from stripping to readily available acrylate adhesives.

The results indicated that increasing amounts of cross-linking agents decrease the mechanical energy dissipated by the material, which is directly related to how much force skin stripping will affect the skin. In spite of the different amounts of cross-linking, there was no notable decay in adhesion force itself, suggesting a property for this SAP. The experiments also showed that low cross-linked PDMS with more free and dangling chains have higher forces when stripping and high adhesion forces due to the presence of such chains, enabling the material to be highly mobile at the same time it easily conforms to a substrate. In the biocompatibility tests, adhesion was comparable with commercial acrylic adhesives and, when stripping SAP and available adhesives off the skin, there was hardly any redness or spots for SAP. In an embodiment, an ostomy adhesive may comprise a low-cross linked PDMS and configured to provide a skin-friendly adhesive that can withstand the weight of a filled ostomy pouch, prevent leakage and may also be waterproof.

The criteria for determining the quality of an adhesive are as follows:

Adhesion to the surface—this involves being able to support the ostomy pouch as well as providing a seal to the peristomal skin. Having too strong of an adhesion makes it difficult to remove the barrier from the skin surface. The adhesive also needs to be flexible in order to maintain proper and complete contact with the skin in order to be secure.

Moisture absorption/response—the adhesive must absorb moisture from the skin while not being high enough to increase erosion and leave residue.

Erosion resistance—the adhesive framework and absorption of hydrocolloids need to be strong enough to have a resistance to wearing down or disintegrating when it comes into contact with the effluent.

Flexibility—should be able to bend easily and maintain proper adhesion/contact to the skin based on changes in the individual's body or movement.

Ease of removal and stress on the surrounding peristomal skin—the adhesive should be easy to remove and not require as much force as to leave residue or cause damage/skin irritation.

Effect on the skin—this involves maintaining normal skin pH as well as being hypoallergenic.

Skin Models for Testing Adhesives

Liquid Suspensions

Liquid suspensions are lipid, polymeric, and inorganic particles suspended in water, milk, or oils that may be used to simulate the optical properties of tissues such as scattering and light absorption. Lipid solutions, monodispersed polystyrene, and titanium dioxide particles are commonly used models for skin, specifically the tissue underneath the skin. These models need to be embedded in solid recipients to study and are most useful when the surface and mechanical properties of the skin are unimportant.

Epoxy Resin

Epoxy Resin are cross-linkable materials with the epoxy functional group. Properties of the material are dependent on the resin type and mixture composition and may be functionalized to be similar to skin. Epoxy resin may be used to simulate the optical and especially the thermal properties of skin due to the model having a very similar thermal diffusivity. The refractive index can also be adjusted to be similar to that of skin. Epoxy resin is a useful material for creating temperature profiles during cryogen cooling processes and to analyze the dependence of temperature changes on differing conditions. This is a very useful skin model but may not address many properties of skin such as sweat, surface and mechanical properties, etc.

Textiles

Textile skins composed of natural and synthetic polymers may be used to study sweat distribution. Natural and synthetic leathers may also be used to simulate the mechanical and frictional contact behavior of skin. Textile skins may be placed over a thermophysiological device to adjust temperature and humidity settings. Types of textiles include pre-wetted textile skin, textile skin with water delivered through nozzles, and waterproof models that are vapor permeable.

Metals

Metals may be used to test the properties of clothing on the skin due to their thermal properties, such as heating and cooling elements. The type of metal may not be as relevant as the design of the product, and a large advantage of having metals is their stable properties, robustness, and reproducibility via use of technology. Considering the relevance to ostomy, the metal may incorporate skin temperature and heat transport as well as sweating and moving capabilities (sweating rate). Replicating the mechanical properties (such as elasticity or density) and thermal inertia of the skin may be limited using metals and can be relatively time-consuming and expensive to manufacture for adhesive testing. In an embodiment, an apparatus such as the sweating guarded hot plate may be configured to fit transient conditions in order to test how the adhesive responds to heat and moisture. Such instrument may be configured to simulate heat and moisture transfer from the body surface through clothing material to the environment. The flow of moisture vapor may be calculated using Fick's diffusion law, and the apparatus may comprise a measuring unit, temperature controller, and water supply unit.

Gelatinous Substances

Gelatinous substances may comprise agar/agarose, collagen, gelatin, polyvinyl alcohol, and other materials, and may interact with water. They are versatile, easy to produce, and reversible, which allows for modification and control over physical, chemical, and mechanical properties of the gel. Gelatin is derived from the partial hydrolysis of collagen, and the dry version of it can be stored for longer periods of time. It may be used to simulate human tissue density and viscosity, and a second layer simulating the epidermis can be combined with the gelatin block to create a skin-like surface for testing adhesives. The density, sound speed, stiffness, absorption, and light scattering of gelatin may be configured similar to that of human skin. Agar is made from seaweed polysaccharides, and mixing it with water allows for modification and control of several properties. Molds can be used to fit the agar into a particular shape, and the acoustic velocity, acoustic impedance, and density may be similar to that of skin. Agar may be relatively unstable and may have a short lifetime. Polyvinyl alcohol (PVA) is a synthetic polymer formed via crosslinking of hydrogels. PVA cryogels may be used to simulate skin and soft tissue, which are relatively stable and easy to store. Scattering coefficients and stiffness of the PVA cryogels can be modified easily. PVA may be used for optical, acoustic, and magnetic property testing. In an embodiment, a device configured to simulate skin for testing adhesives may be formed from gelatinous substances. It is important to note the differences between the gelatinous materials and which properties of the skin they are best at simulating.

Elastomers

Elastomers are polymer structures that can be configured to exhibit properties and characteristics similar to human skin. These materials present viscoelasticity and thermoplasticity because the polymer glass temperature (i.e. threshold temperature that allows rubber-like characteristics) is far below room temperature. There is a wide range of polymer options that can be manufactured into skin models. Suitable elastomers for skin models include, but are not limited to, polyurethane (PU) and polydimethylsiloxane (PDMS), which may be configured to have skin-like properties at a relatively low-cost, and ease of use.

Properties of PU may be modified by utilizing ratios of soft to hard phase polymer, reinforcing particles such as carbon black, and PU sponges to make it more skin-like. In an embodiment, a skin model may comprise an outer layer formed from PU and configured to simulate an epidermis and an inner layer formed from PU-foam and configured to simulate a dermis layer. The PU skin model may be configured to emulate roughness, topography, and water contact angle of human skin, as well as exhibit similar force-deformation characteristics to those of skin. It also presents a long and stable shelf-life, low-cost, and it is relatively easy to manage and inexpensive.

Cross-linked PDMS may be used to form a scaffold for skin model. Nano and micro-fillers may be added to the polymer structure to tune its properties to make it similar to the skin. For example, titanium dioxide may be added to change the dielectric constant, carbon black may be added to adapt electrical conductivity, and collagen may be used to coat PDMS to make it more skin-like. PDMS may be configured to have a refractive index similar to that of the skin, making it a suitable optical model. Silicon-based skin models may be configured to provide ease of manipulation, nontoxicity, long and stable shelf-life, and relatively cost effective. Cured PDMS may be waterproof and may withstand proteolytic activity.

In an embodiment, a device configured to simulate peristomal skin may comprise a microfluidic device formed from PDMS. The device may be configured to be a tunable substrate to simulate properties of various normal skin and peristomal skin conditions. The microfluid device may comprise a channel structure configured to provide a flow path for liquid substances, such as sweat-emulating saline solution. In an embodiment, an ostomy adhesive or other medical adhesive may be attached to the device and absorption of the sweat-emulating saline solution at various concentrations by the adhesive may be measured, wherein controlled parameters may include:

Saline solution composition and concentrations—the interaction of the composition of the sweat solution to the adhesive can be tested this way to verify interesting hypotheses (i.e. does lower water concentration in sweat benefit adhesion? Would drinking more water prior to removal increase or decrease the difficulty of removal?)

Flow rates of sweat into the microfluidic device—flow rates may be determined and controlled through algorithms to simulate different working conditions (i.e. if a test subject were to exercise intensely for 30 minutes and then rest)

Time of exposure—different times of sweat exposure to simulate working conditions of the adhesive to provide more insight into adhesion failure rates from different absorption profiles By measuring the mass of various components of the system, quantitative absorption rates and profiles may be determined for different adhesive materials. Further, qualitative and quantitative measurements of ease of removal may be performed with the use of known apparatus. A method of testing adhesives using the microfluidic device formed from PDMS according to an embodiment is schematically illustrated in FIG. 1. The microfluidic device may be configured to simulate peristomal skin and provide a surface for an adhesive to adhere to. The microfluid device may also be configured to be tuned to various skin-like mechanical and other properties.

Figure 2:
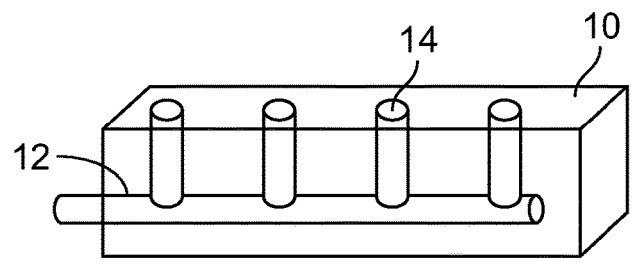
FIG. 2 is a schematic illustration of a microfluidic device configured to simulate peristomal skin conditions according to an embodiment.

FIG. 2 is a schematic illustration of the microfluidic device 10 configured to simulate peristomal skin conditions according to an embodiment. The microfluidic device 10 may be formed from PDMS and comprise at least one channel 12 connected to a plurality of openings 14 configured to simulate skin pores, through which fluid may flow at predetermined rates. The pore structures and channels may be configured to simulate sebaceous and sweat glands as closely as possible. In an embodiment, the microfluidic device 10 may be configured to mimic properties of sebaceous glands of abdominal skin or the skin of other anatomical sites. In some embodiments, the at least one channel 12 and the plurality of openings 14 may be configured to simulate capillary structures and density of peristomal skin pores.

In an embodiment, the microfluidic device may be tuned to simulate various peristomal skin conditions, wherein a composition of PDMS structure and cross-linking amount may be changed, curing conditions for the PDMS may be changed, functionalization of PDMS may be changed, size of the channels may be changed, and/or PDMS may be coated to alter waterproof properties. In an embodiment, the microfluid device may be connected to a tubing and a means for supplying liquid, such as a syringe and a pump. The liquid flow rate in the microfluid device may be controlled through an algorithm. In an embodiment, the microfluid device may comprise a means for controlling the temperature of the device, such as a heating mat, to maintain the temperature of the device at a body temperature. In an embodiment, the microfluid device may comprise an algorithm configured to control a liquid flow rate and temperature of the device. For example, the microfluidic device may be configured to increase a temperature of the device to a predetermined higher temperature and a faster liquid flow rate to simulate peristomal skin when an ostomate exercises.

Figure 3:
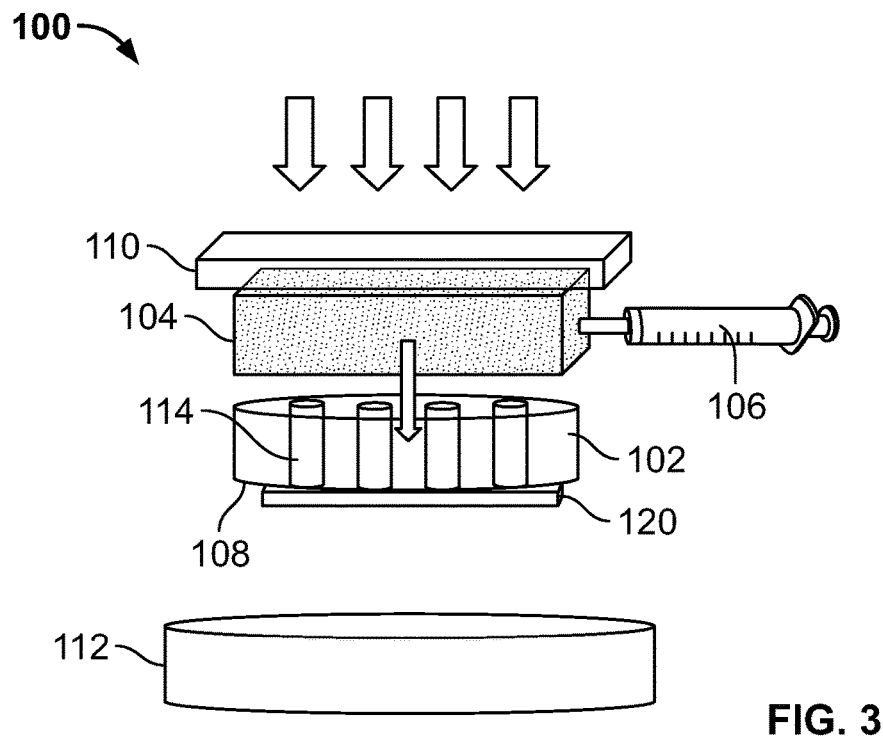
FIG. 3 is a schematic illustration of a skin-mimicking device according to an embodiment.

FIG. 3 is a schematic illustration of a skin-mimicking device 100 configured to simulate peristomal skin conditions according to an embodiment. The skin-mimicking device 100 may comprise a body 102 formed from PDMS and a plurality of openings 114 extending across the thickness of the body 102 to provide a plurality of conduits or fluid flow paths therethrough. The skin-mimicking device 100 may further comprise a backing layer 104 formed from a sponge or other similar materials, wherein a sweat mimicking saline solution may be supplied to the backing layer 104 via a syringe 106 or other similar devices. In such an embodiment, the skin-mimicking device 100 may be configured to simulate a perspiring peristomal skin, wherein the sweat mimicking saline solution may flow through the plurality of openings 114 as the backing layer 104 becomes saturated with the solution. As shown in FIG. 3, an adhesive 120 may be attached to an outer surface 108 of the body 102 for testing adhesive properties at various perspiration conditions using the skin-mimicking device 100, wherein the perspiration condition may be tuned by controlling the flow rate of the solution flowing through the plurality of openings 114.

In an embodiment, the body 102 of the skin-mimicking device 100 may be formed from a slab of PDMS. The plurality of openings 114 may be formed by punching holes in the slab. The holes may be punched using a 1.5 mm hole punch. A backing layer 104 formed from a sponge may be filled with liquid and arranged against a surface of the body 102. A glass slide 110 may be arranged over the backing layer 104, such that the backing layer 104 may be arranged between the glass slide 110 and the body 102. The glass slide 110 may be used to compress the sponge backing layer 104 to facilitate liquid in the sponge backing layer 104 to seep through the plurality of openings 114. The body 102, backing layer 104 and glass slide 110 may be arranged in an enclosure configured to provide a controlled flow of liquid through the plurality of openings 114 to emulate skin perspiration. A container 112 may be provided to collect any residual liquid.

Figure 4:
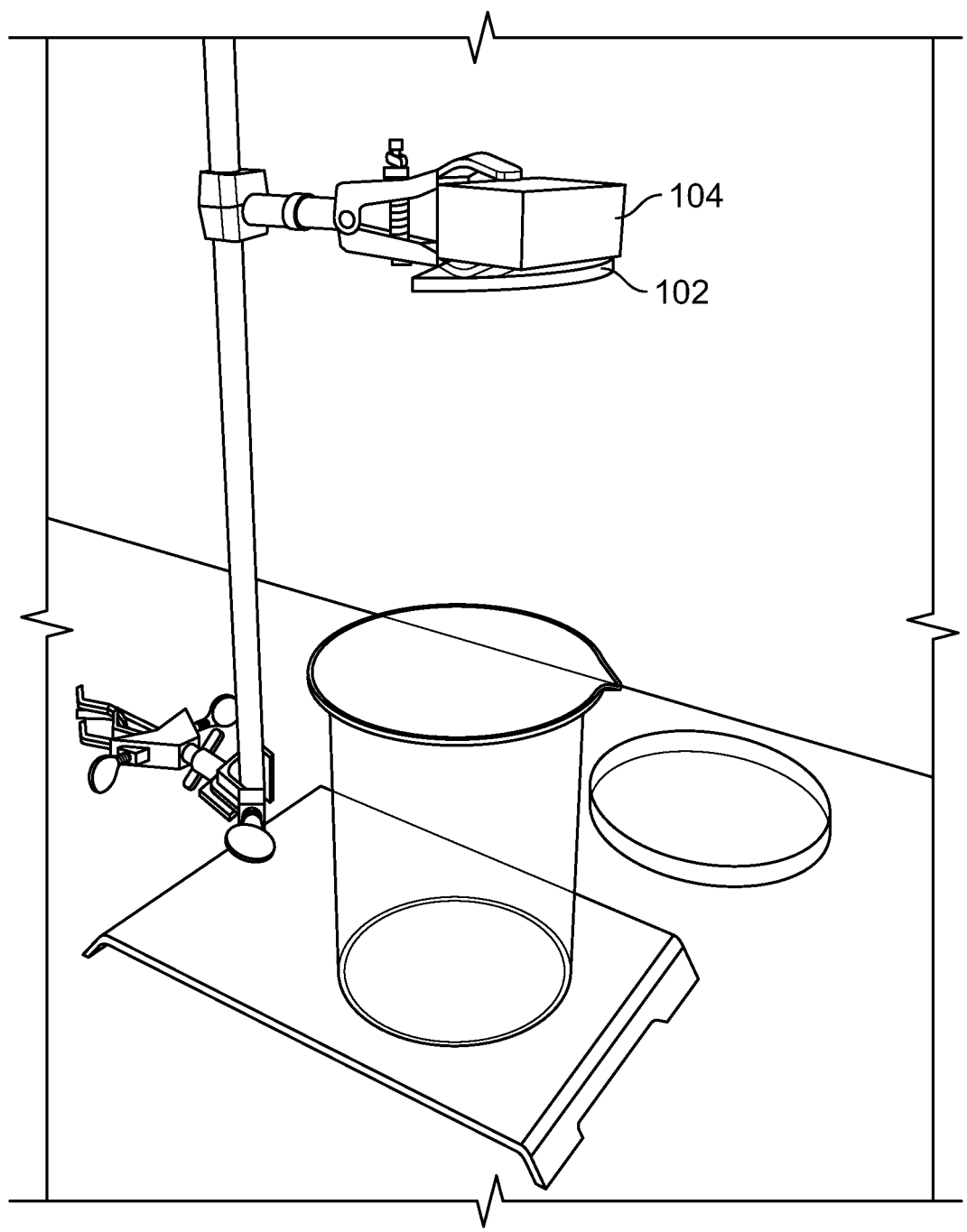
FIG. 4 is an illustration of the skin-mimicking device of FIG. 3 set up for an adhesive testing according to an embodiment.
Figure 5:
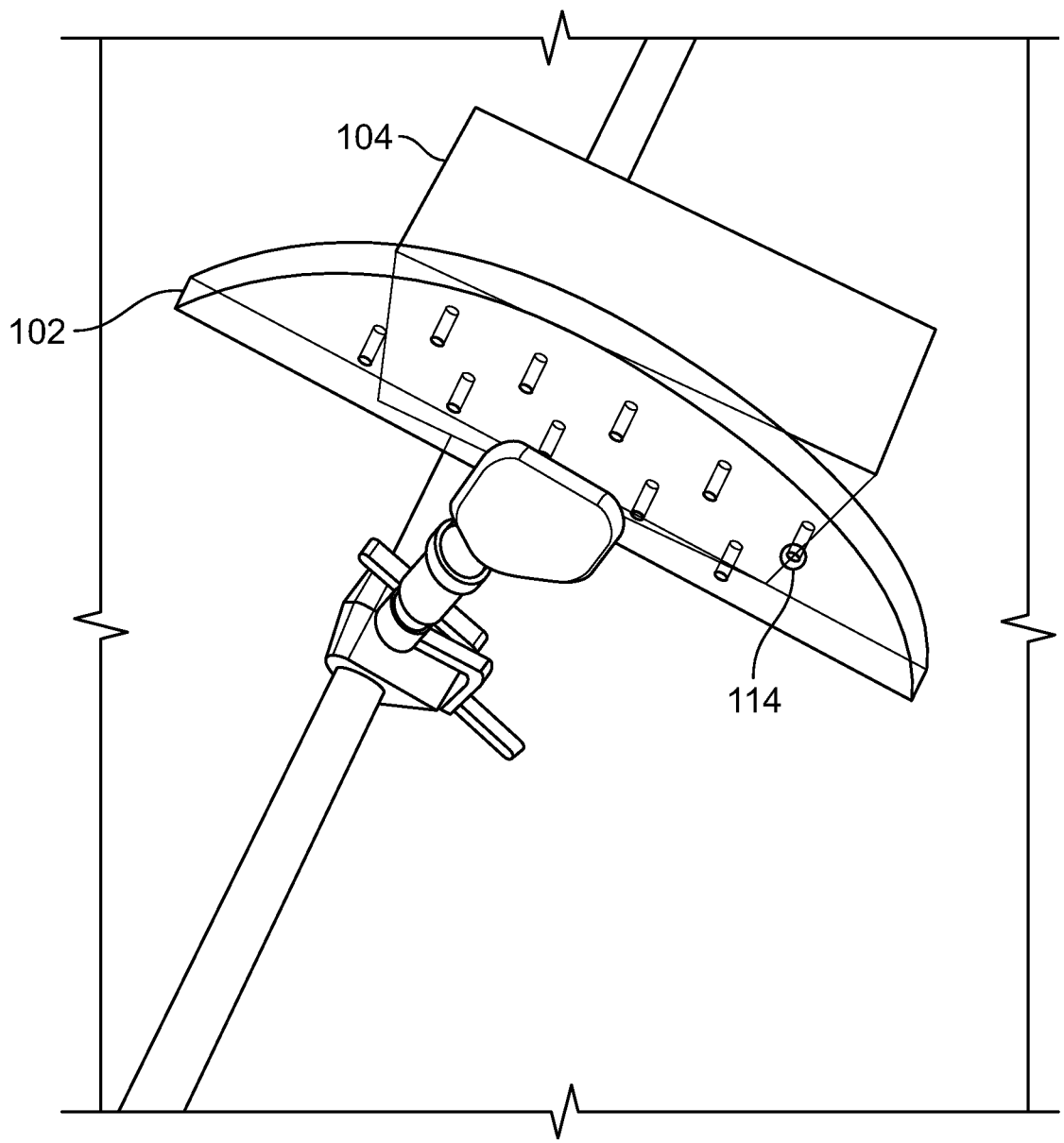
FIG. 5 is another illustration of the skin mimicking device of FIG. 3.

FIGS. 4 and 5 show illustrations of the skin-mimicking device 100 set up for an adhesive testing according to an embodiment.

Figure 6:
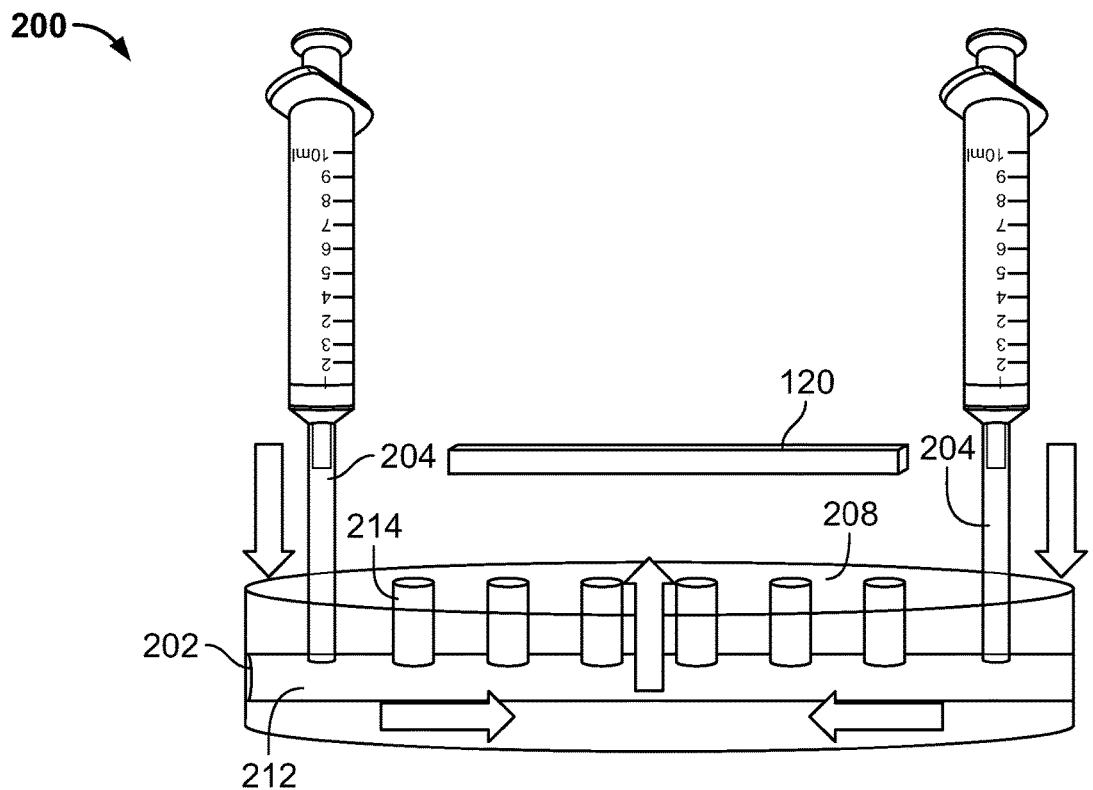
FIG. 6 is a schematic illustration of a skin-mimicking device according to another embodiment.

FIG. 6 is a schematic illustration of a skin-mimicking device 200 according to another embodiment. The skin-mimicking device 200 may be configured similar to the skin-mimicking device 100 generally comprising a body 202 formed from PDMS and a plurality of openings defining a plurality of conduits 214 for providing fluid paths to simulate various skin perspiration conditions. In this embodiment, the plurality of conduits 214 may be connected to at least one reservoir 212 for supplying sweat mimicking liquid. The plurality of conduits 214 may extend from the at least one reservoir 212 to an outer surface 208 of the body 202 to provide a plurality of fluid flow paths therethrough. The skin-mimicking device 200 may further comprise at least one inlet tube 204 connected to and in fluid communication with the at least one reservoir 212, wherein the at least one inlet tube 204 may be connected to a liquid supply device, such as a syringe or other similar device, for supplying the sweat-mimicking saline solution. The at least one inlet tube 204 may be configured to provide a fluid flow path that forms about a 90° angle with a flow path defined in the at least one reservoir 212.

In an embodiment, the reservoir 212 may be etched in the body 202. The plurality of conduits 214 may be configured to mimic skin pores. Water or sweat mimicking liquid may be pumped into the reservoir 212 via syringes, or other similar fluid supplying devices, connected to a pump, for example, a syringe may be connected to a syringe pump, to control a flow rate of liquid into the reservoir 212. A fluid pressure in the reservoir 212 filled with water or sweat mimicking liquid may facilitate flow of the same through the plurality of conduits 214 to mimic skin perspiration. In an embodiment, the body 202 may be molded including the plurality of conduits 214 and at least one reservoir 212.

Figure 7:
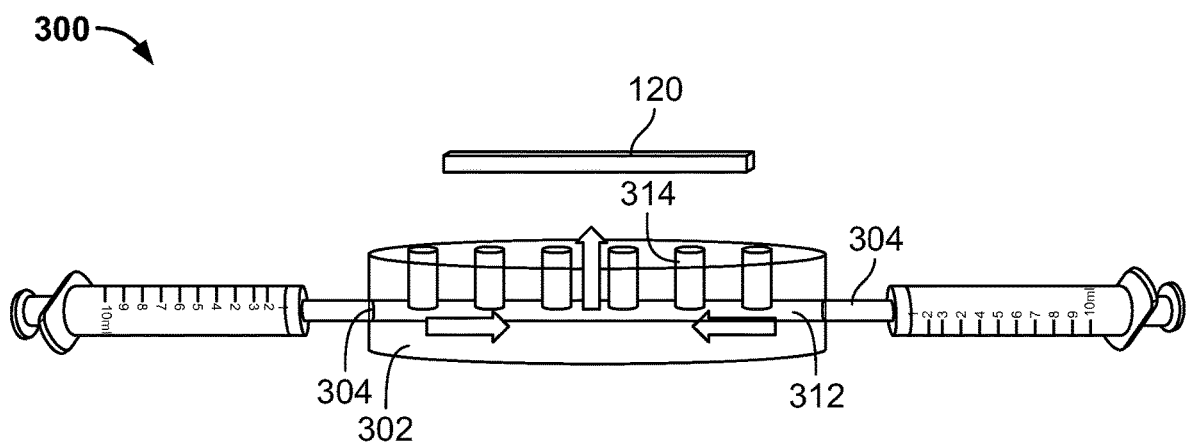
FIG. 7 is a schematic illustration of a skin-mimicking device according to yet another embodiment

FIG. 7 is a schematic illustration of a skin-mimicking device 300 according to yet another embodiment. The skin-mimicking device 300 may be configured similar to the skin-mimicking device 200 generally comprising a body 302 formed from PDMS and fluid paths provided via a plurality of conduits 314, at least one fluid channel 312, and at least one inlet tube 304. In this embodiment, the at least one inlet tube 304 may be configured to provide a fluid flow path that forms about a 180° angle with a flow path defined in the at least one fluid channel 312. In another embodiment, the fluid path 304 may form increasing angles with the plurality of conduits 314, lengthening them in order to create a gradient of flow rates across the substrate. This gradient may also be created by decreasing or increasing the diameters of the plurality of conduits 314.

Figure 8:
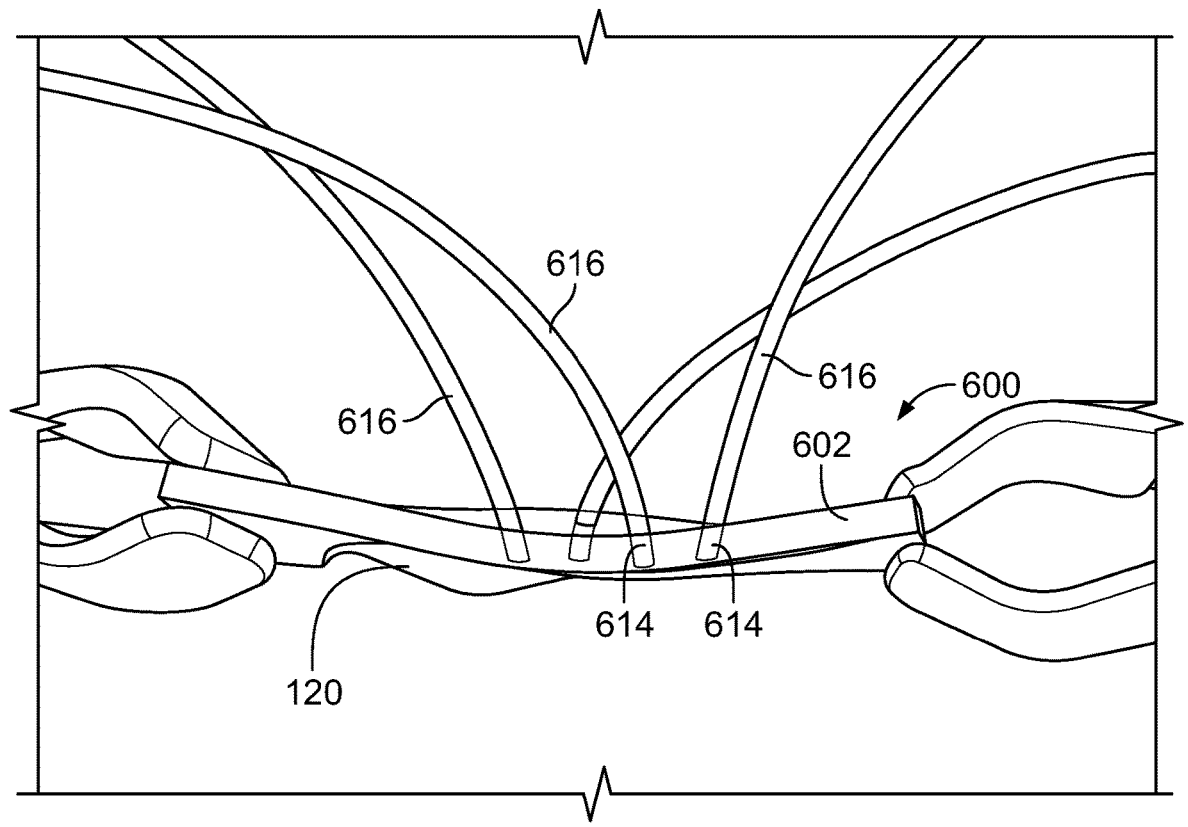
FIG. 8 is an illustration of the skin-mimicking device of FIG. 6 set up for an adhesive testing according to an embodiment.
Figure 9:
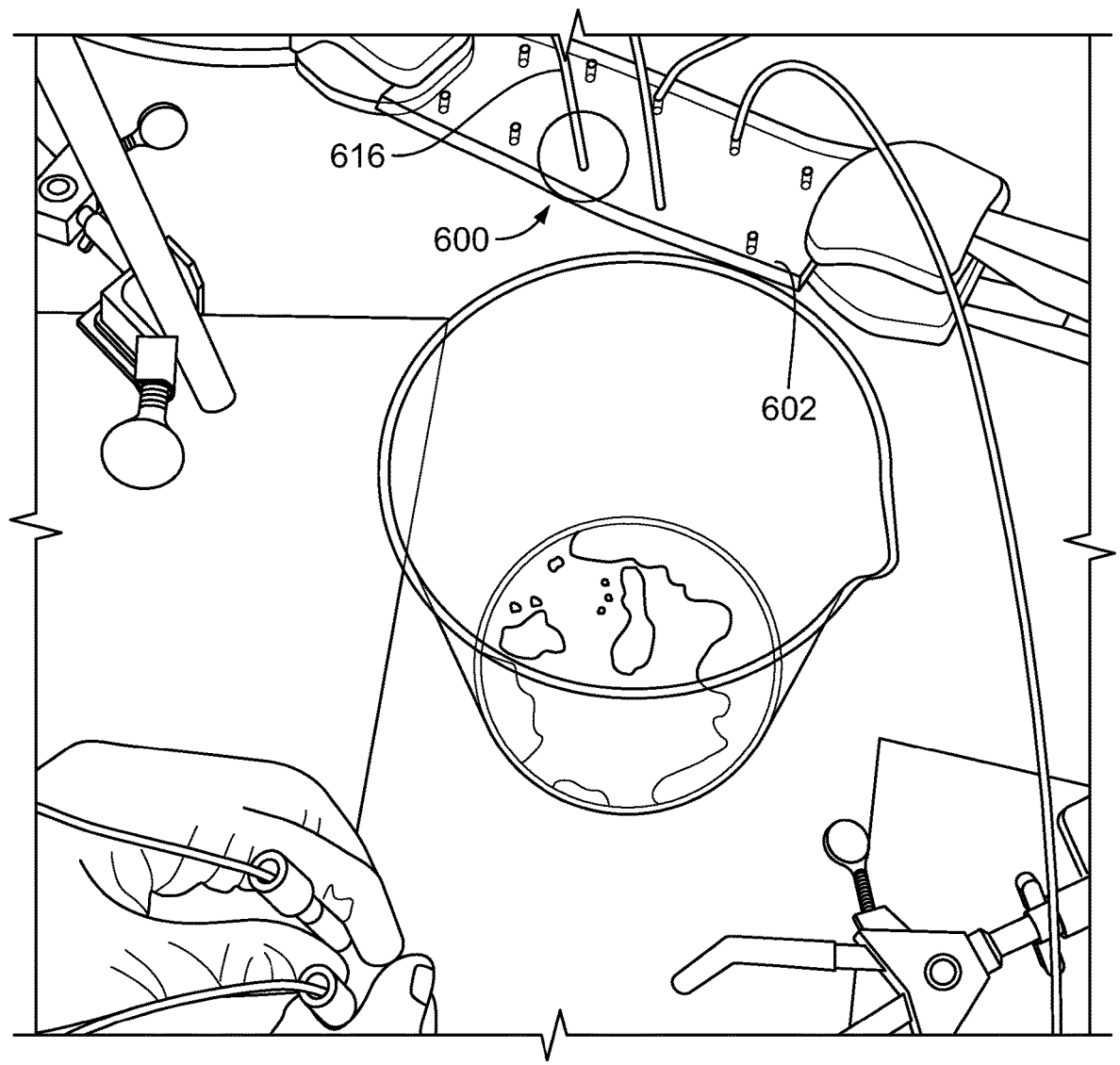
FIG. 9 is another illustration of the skin mimicking device of FIG. 3.

FIGS. 8 and 9 show illustrations of a skin-mimicking device 600 set up for an adhesive testing according to an embodiment. The skin-mimicking device 600 may be configured similar to the skin-mimicking device 100 generally comprising a body 602 formed from PDMS and a plurality of openings defining a plurality of conduits 614 for providing fluid paths to simulate various skin perspiration conditions. In this embodiment, the skin-mimicking device 600 may include a plurality of tubes 616, each of which may be connected to one of the plurality of conduits 614 to supply sweat mimicking liquid. For example, the tube 616 may be fitted into each of the plurality of openings 614, wherein each of the tube 616 may be connected to a separate liquid supply, such as a syringe pump. In such an embodiment, a flow rate through each of the plurality of conduits 614 may be controlled separately via the liquid supply connected thereto.

Figure 10:
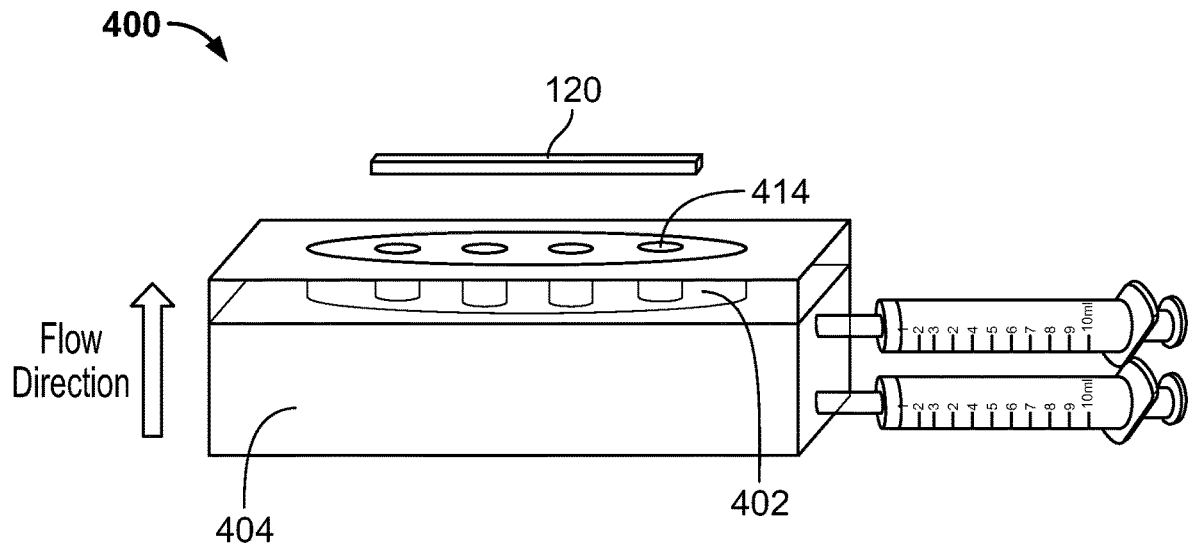
FIG. 10 is a schematic illustration of a skin-mimicking device according to an embodiment.

FIG. 10 is a schematic illustration of a skin-mimicking device 400 according to an embodiment. The skin-mimicking device 400 may be configured similar to the skin-mimicking device 100 generally comprising a body 402 formed from PDMS and a plurality of conduits 414 extending across the thickness of the body 402 to provide a plurality of fluid flow paths therethrough. In this embodiment, the skin-mimicking device 400 may comprise a backing container 404 filled with a sweat mimicking saline solution instead of the backing layer 104. The solution may be supplied to the backing container 404 using a syringe, a pump, or other similar devices. In this embodiment, the skin-mimicking device 400 may be configured to provide a fluid flow direction against gravity, which may provide a relatively even pressure gradient across the plurality of conduits 414 when compared to the other skin-mimicking device embodiments 100, 200, 300, wherein some conduits are located closer to the fluid supply inlet than others.

Figure 11:
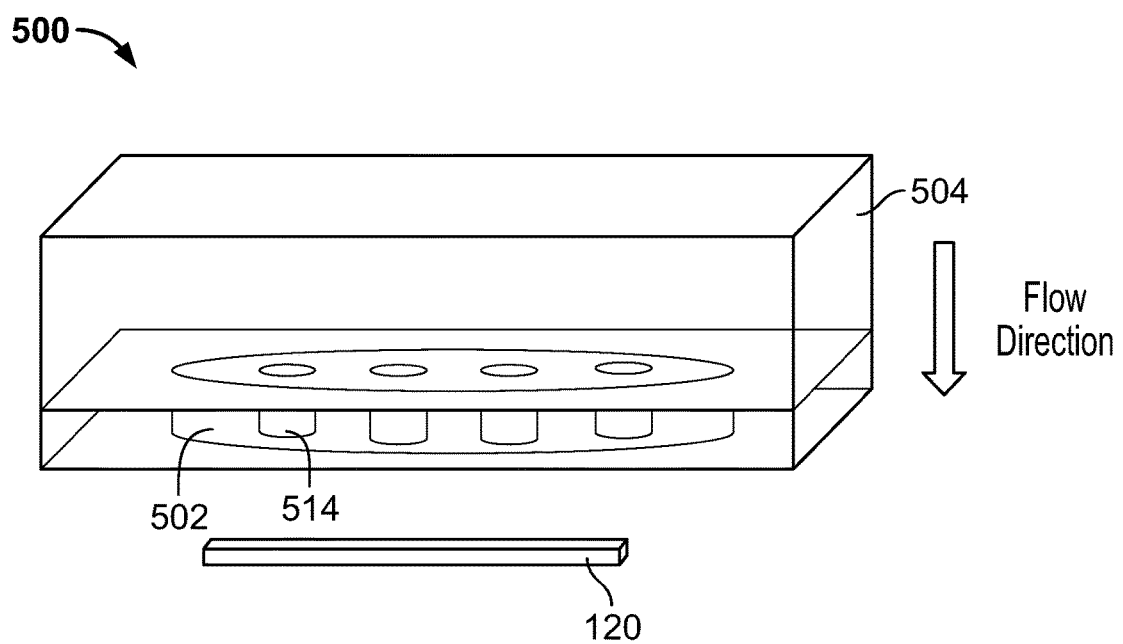
FIG. 11 is a schematic illustration of a skin-mimicking device according to another embodiment.

FIG. 11 is a schematic illustration of a skin-mimicking device 500 according to an embodiment. The skin-mimicking device 500 may be configured similar to the skin-mimicking device 400 generally comprising a body 502 formed from PDMS, a plurality of conduits 514 extending across the thickness of the body 502, and a backing container 504 filled with a sweat mimicking saline solution. In this embodiment, the skin-mimicking device 500 may be configured to provide a gravity flow.

The skin mimicking device 100, 200, 300, 400, 500, 600 may be tuned to mimic various skin properties and perspiration conditions by adjusting a thickness of the body 102, 202, 302, 402, 502, 602 formed form PDMS, a size of the plurality of conduits 114, 214, 314, 414, 514, 614, a flow rate of liquid through the plurality of conduits, and adhesion characteristics of the body to various adhesives. The PDMS may be formulated and configured to emulate elasticity, surface skin condition, and/or composition of a target skin. For example, a flexibility and elasticity of a skin mimicking device body may be tuned by functionalizing PDMS and/or varying a degree of PDMS cross-linking. Further, the PDMS may be formulated to include a particular ingredient(s) to mimic a skin condition. In an embodiment, the skin mimicking device 100, 200, 300, 400, 500, 600 may be configured to provide a controlled flow rate of a fluid through the plurality of conduits 114, 214, 314, 414, 514, 614 of about 0.1 μL/min to about 200 μL/min to emulate various skin sweating conditions.

EVALUATION

Samples of the skin mimicking device 200 were prepared and evaluated. The samples included a body 202 formed from PDMS comprising a reservoir 212 and a plurality of conduits 214 connected thereto. Each of the plurality of conduits 214 was configured to have a diameter of about 0.2 mm. The reservoir 212 of the samples were filled with water, and a surface humidity of the samples were measured as transdermal water loss (TEWL) values using a Tewameter®. TEWL values of forearms and abdomen of three volunteers were also measured and compared with TEWL values of the sample. TEWL values of the samples were very compatible with the TEWL values of the forearms and abdomen.

A first batch of the samples were configured to provide a fluid flow rate of about 0.015 μL/min to simulate the homeostatic human sweat at a flow rate of 3 g/m²min. A second batch of the samples were configured to provide a fluid flow rate of about 0.3 μL/min to minimize a pressure gradient and other external forces to simulate the homeostatic human sweat. Yet another batch of the samples were configured to provide a fluid flow rate of about 50 μL/min to simulate a stoma leakage.

It is understood that the relative directions described above, e.g., "upward," "downward," "upper," "lower," "above," "below," are used for illustrative purposes only and may change depending on an orientation of the ostomy pouch and/or the patient. Accordingly, this terminology is non-limiting in nature. In addition, it is understood that one or more various features of an embodiment above may be used in, combined with, or replace other features of a different embodiment described herein.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A skin-mimicking device, comprising:
a body;
a backing layer attached to the body, wherein a sweat mimicking fluid is supplied to the backing layer; and
a plurality of conduits defining a plurality of fluid paths to an outer surface of the body;
wherein the skin-mimicking device is configured such that the sweat mimicking fluid flows through the plurality of conduits as the backing layer becomes saturated with the fluid, wherein the skin-mimicking device is configured to simulate various skin perspiration conditions and/or various physical skin conditions, wherein the skin-mimicking device is configured to control a fluid flow rate through the plurality of conduits to provide the various skin perspiration conditions.

2. The skin-mimicking device of claim 1, further comprising at least one fluid reservoir connected to the plurality of conduits for supplying a sweat mimicking fluid, the plurality of conduits extending from the at least one fluid reservoir to the outer surface of the body to provide the plurality of fluid flow paths therethrough.

3. The skin-mimicking device of claim 2, further comprising at least one liquid pump connected to the at least one fluid reservoir for supplying the sweat-mimicking fluid, the liquid pump configured to control the fluid flow rate.

4. The skin-mimicking device of claim 2, wherein the at least one fluid reservoir is provided in the body.

5. The skin-mimicking device of claim 1, wherein the backing layer is formed from a sponge.

6. The skin-mimicking device of claim 1, wherein the backing layer is a reservoir container filled with the sweat mimicking fluid.

7. The skin-mimicking device of claim 6, wherein the skin-mimicking device is configured to provide a fluid flow direction against gravity from the reservoir container to the plurality of conduits.

8. The skin-mimicking device of claim 6, wherein the skin-mimicking device is configured to provide a gravity flow of the sweat mimicking fluid from the backing container to the plurality of conduits.

9. The skin-mimicking device of claim 1, wherein the plurality of conduits defines a plurality of circular openings on the outer surface of the body, wherein each of the circular openings has a diameter of about 0.2 mm.

10. The skin-mimicking device of claim 1, wherein the skin-mimicking device is configured to provide a fluid flow rate through the plurality of conduits of about 0.01 µL/min to about 100 µL/min.

11. The skin-mimicking device of claim 1, wherein the skin-mimicking device is configured to provide a fluid flow rate through the plurality of conduits of about 0.015 µL/min.

12. The skin-mimicking device of claim 1, wherein the skin-mimicking device is configured to provide a fluid flow rate through the plurality of conduits of about 0.3 µL/min.

13. The skin-mimicking device of claim 1, wherein the skin-mimicking device is configured to provide a fluid flow rate through the plurality of conduits of about 50 µL/min.

14. The skin-mimicking device of claim 1, wherein the body is formed from polydimethylsiloxane.

* * * * *